March 20, 1951 T. DEDIO 2,545,992
LEVEL INDICATOR FOR SEED HOPPERS
Filed March 11, 1950
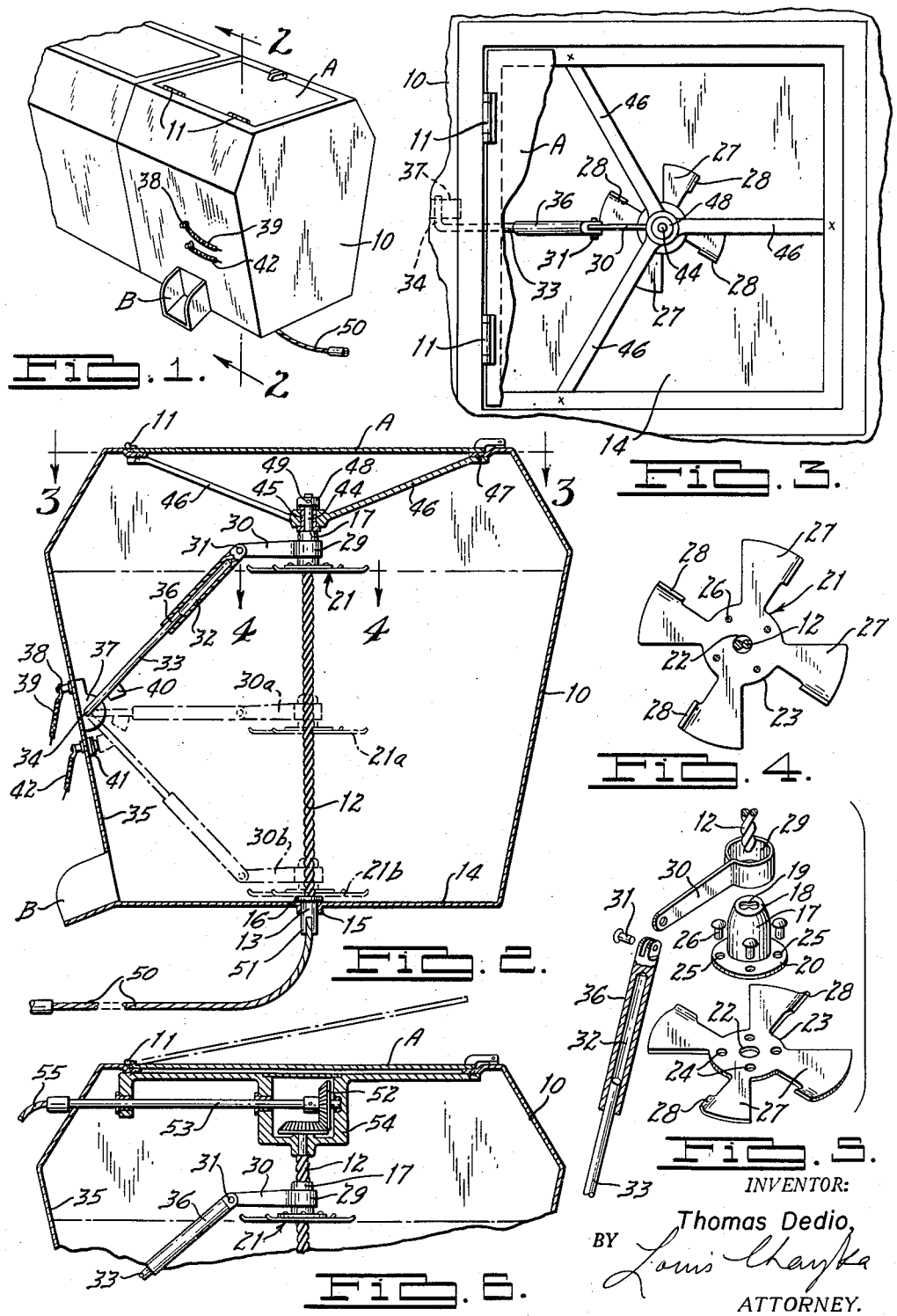
INVENTOR:
Thomas Dedio,
BY Louis Chayka
ATTORNEY.

Patented Mar. 20, 1951

2,545,992

UNITED STATES PATENT OFFICE 2,545,992

LEVEL INDICATOR FOR SEED HOPPERS

Thomas Dedio, Thorsby, Alberta, Canada

Application March 11, 1950, Serial No. 149,109

5 Claims. (Cl. 177—311)

My improvement pertains to a device to be employed in hoppers on press grain drills, the purpose of the device being to indicate when the level of the contents of the hopper has sunk dangerously low, calling for replenishment of said hopper. A further purpose of my improvement is to provide a device which, in the course of its operation, will close an electric circuit in order to sound an audible alarm or to operate a visible gauge or a dial to call the attention of the operator of the grain drill to the fact that the hopper needs to be refilled.

The specific nature of the device and the details of its construction will now be clearly described with reference to the accompanying drawings in which:

Fig. 1 is a perspective view of a conventional hopper used on press grain drills but equipped with my indicating device;

Fig. 2 is a sectional view on line 2—2 of Fig. 1;

Fig. 3 is a top view of the hopper including my device, the top cover of the hopper being partly broken off to afford a view of the interior of said hopper, the view being taken in the direction of arrows 3—3 of Fig. 2;

Fig. 4 is a top plan view of a member of my device as seen by looking in the direction of arrows 4—4 of Fig. 2;

Fig. 5 is an exploded view of some of the operative elements of my device;

Fig. 6 is a sectional view of a modified structure of parts of my device.

Similar numerals refer to similar parts throughout the several views.

The hopper 10, which may be made of any suitable material, is provided with a hinged cover A and a discharge spout B. Both of these details are of non-critical character and may be varied as desired. Mounted for rotation within the hopper is an upright shaft 12 which is best made of two lengths of wire turned about each other, the resulting structure being equivalent to a shaft provided with a spiral fin, the latter being, in turn, equivalent to an inclined plane. At its lower end the shaft terminates with a vertical pin 13 passing through the bottom 14 of the hopper and disposed in a bearing 15 on the under side of said bottom. An annular shoulder 16 on the inner side of the hopper serves as a means of preventing an axial downward displacement of the shaft. Mounted on the shaft is a hollow cylindrical glider 17 having a domed top 18 provided with an aperture 19, in the form of an hourglass. The aperture includes two circular openings, each being of a diameter slightly in excess of the diameter of one of the wires composing the shaft. An annular horizontal flange 20 in the base of the cylinder serves as a supporting means for a four-bladed fan, generally indicated by numeral 21. The fan is provided with an opening 22 in the center of its hub portion 23, the openings being large enough to receive shaft 12 without a frictional contact therewith. A plurality of small openings 24 are arranged in register with similar openings 25 in flange 20 of the glider 17 as a means of connecting the fan to the glider by means of bolts 26. Each individual blade 27 of the fan is bent in what is its entering edge 28 to a slight pitch, as best shown in Fig. 5. Loosely seated upon the glider is a collar 29 provided with a radial shank 30. Pivotally affixed to the outer end of the shank at 31 is a tubular arm. A metal rod 33, at one end pivotally connected, at 34, to a bracket 37 on wall 35 of the hopper, fits at its other end, 36, into said arm 32, being in a telescopic sliding connection therewith. Mounted on the outside of wall 35 is an electric terminal 38 for attachment of an insulated wire 39 leading to one terminal of an electric battery which is not shown. A knob 40, affixed to rod 33, close to its end pivoted at 34, is adapted to establish contact with a member 41 insulated from the wall and leading, by means of a wire 42, to an electric bell or to a gauge mounted upon the dashboard of the vehicle driven by the operator of the drill press, said bell or a gauge being, in turn, connected to the other terminal of the storage battery. It will be understood that the manner of wiring is only suggestive. It will be also understood that any suitable gauge may be used which on closing of the electric circuit, including such a gauge, will operate visible means to indicate that the hopper is to be refilled.

At its upper end shaft 12 terminates with a short axle 44 disposed for rotation within a bearing 45 which is held in a spider 46. The spider is affixed at its outer ends to the underside of the top portion of the hopper, as shown at 47. A retaining ring 48, including a set screw 49, is affixed to the upper end of the shaft to prevent the movement of the shaft vertically.

It will be understood that in order to operate my device it will be necessary to impart a rotary movement to shaft 12. This is accomplished by means of a flexible cable 50 clamped at one end within the slotted lower end 51 of pin 13, as shown in Fig. 2. The cable, in turn, may be rotated by any suitable power means within the vehicle upon which the hopper is mounted. It will be understood that some control means must be employed to start the operation of the device or to discontinue it when desired, and that the operation of the device may be discontinued irrespective of the movement of the vehicle on which the device is mounted.

In Fig. 6 I am showing a modified mechanism adapted to rotate the shaft 12. In this case I am employing bevelled gears 92 driven by shaft 53, both the gears and the shaft being supported within the upper portion of the hopper by a bracket 54. The advantage of this construction lies in the fact that the bottom of the hopper need not contain any aperture for admission of means to rotate the shaft from below.

I may mention at this point that in the species shown in Fig. 6, as well as in the species shown in the preceding figures, shaft 12 does not have to be made exactly in the manner shown in the drawings, but that it may be made of one solid strip of metal turned about its longitudinal axis to impart to it a screw-like appearance, or that said shaft may be made of a suitable stock circular in cross-section but provided with an external thread. Structures of this kind would be just obvious equivalents of the structure shown in the drawings.

I shall now describe the operation of my device. It will be assumed that a hopper is filled with grain and that fan 21, affixed to glider 17, is at its topmost level, as shown in Fig. 2. Now, should the device be set in motion by a suitable control, shaft 12 will begin to rotate about its axis, causing the rotation of fan 21. As the blades of the fan have a slight pitch, that is, as each blade is inclined upwardly along its entering edge, the blades will be working themselves upwardly, keeping on the surface of the grain. As the quantity of grain in the hopper will gradually diminish, the glider, with the fan, will swing downwardly by gravity, the fan remaining continuously on top of said grain until, owing to the low level of the grain, the fan will descend to the bottom of the hopper. The intermediate and lowermost positions of the fan in its descent downwardly are shown in dotted lines 21a and 21b in Fig. 2. The glider, on its descent downwardly, will cause, by means of shank 30, a gradual downward swing of rod 33 until knob 40 on said rod will come in contact with member 41. This will close an electric circuit, resulting in sounding of an alarm bell or causing a gauge or a dial to indicate visually that the hopper needs to be refilled.

It will be obvious that some changes may be made in the structure of my device without departing from the inventive principle disclosed herein.

What I, therefore, wish to claim is as follows:

1. In combination with a hopper of the kind described, a vertical spirally-twisted shaft, a cylindrical glider embracing said shaft, the glider having a closed top provided with an aperture conforming to the twists of the shaft, a fan axially affixed to the lower portion of the glider, a loose collar on said glider, a shank extending radially from said collar, a tubular arm at one end pivotally affixed to the outer end of the shaft, a rod at one end pivotally affixed to the inner wall of the hopper and extending at the other end into said arm in a sliding telescopic relation thereto, wiring for an electric circuit, said circuit including electrically operated signal means, means on the rod to close the circuit to operate said signal means, and means connected to the shaft to impart to it a rotary movement about its axis.

2. In combination with a hopper for a grain drill press which includes a vehicle mounted on wheels, a vertical shaft mounted within the hopper and extending from the bottom to the top portion thereof, the shaft being twisted about its axis to form a screw-like outer surface, a cylindrical glider embracing the shaft and adapted to follow the twists of the shaft in a vertical movement thereupon, a fan mounted on the glider in an axial relation thereto, the fan having a plurality of blades each of which is provided with an upward pitch at its entering edge, a loose collar on the glider, a radial shank extending from the collar, a tubular arm at one end pivotally affixed to the outer end of the shank, a rod at one end pivotally affixed to the inner wall of the hopper midway its height and extending telescopically into said tubular arm for a slideable connection therewith, wiring for an electric circuit, said wiring including terminal means mounted upon the hopper and electrically operated signal means, means upon the rod to close said circuit in order to operate said signal means, and means responsive to the movement of the vehicle to impart a rotary movement to the shaft.

3. In a seed hopper mounted on a vehicle, a level indicator of the kind described, said indicator including a spiral shaft, a cylindrical glider mounted upon said shaft for a vertical spiral movement thereon, a fan connected to the glider in an axial relation thereto, the fan having a central opening to accommodate the shaft and a plurality of blades, each of said blades having an upwardly tilted entering edge, a collar loosely mounted on the glider, the shank extending radially therefrom, a tubular arm at one end pivotally affixed to the outer end of the shank, a rod at one end pivotally mounted on the wall of the shaft and having the other end in a telescopic sliding relation with the tubular arm, the rod being adapted to be swung in a vertical plane from its pivotal connection by said arm in response to the vertical movement of the glider upon the shaft, an electric bell mounted outside the hopper, the bell being included in an electric circuit, means upon the rod to close the electric circuit when the rod has completed its downward swing, and means responsive to the movement of the vehicle to impart to the shaft a rotary movement about its axis.

4. In a seed hopper of the kind described, a vertical shaft comprising two rods spirally twisted about each other, a bearing for the shaft within the lower portion of the hopper, a bearing within the upper portion of the hopper, a cylindrical glider upon the shaft for a spiral vertical movement thereon, a fan affixed to the glider in an axial relation thereto for rotary movement with said glider, a loose collar upon the glider, a shank radially extending from said collar, a rod affixed at one end to the wall of the hopper midway its height and connected at the other end by intermediate means to the shank to cause a vertical swing of the rod to follow the vertical movement of the glider, wiring for an electric circuit, terminal means on the hopper for connection into said electric circuit, an electric bell within said circuit, means on the rod to close said circuit when said rod has completed its swing downwardly, and means responsive to the movement of the vehicle to impart a rotary movement to the shaft.

5. In a seed hopper of the kind described, a vertical shaft comprising two rods spirally twisted about each other, a bearing for the shaft within the lower portion of the hopper, a bearing within the upper portion of the hopper, a cylindrical glider upon the shaft for a spiral vertical movement thereon, a fan affixed to the glider in an axial relation thereto for rotary movement with said glider, a loose collar upon the glider, a shank radially extending from said collar, a rod affixed at one end to the wall of the hopper midway its height and connected at the other end by intermediate means to the shank to cause a vertical swing of the rod to follow the vertical movement of the glider, wiring for an electric circuit, said wiring including terminal means on the hopper, means on the rod to close said circuit when said rod has completed its swing downwardly, electrically operated signal means within the circuit to indicate that the rod has completed its swing, and means responsive to the movement of the vehicle to impart a rotary movement to the shaft.

THOMAS DEDIO.

REFERENCES CITED

The following references are of record in the file of this patent:

UNITED STATES PATENTS

| Number | Name | Date |
| --- | --- | --- |
| 1,140,131 | Dorr | May 18, 1915 |
| 1,939,368 | Rydmark et al. | Dec. 12, 1933 |